United States Patent [19]

Watanabe

[11] Patent Number: 5,185,804
[45] Date of Patent: Feb. 9, 1993

[54] OPERATING DEVICE OF AN ELECTRONIC EQUIPMENT MOUNTED ON A MOTOR VEHICLE

[75] Inventor: Masaaki Watanabe, Saitama, Japan

[73] Assignee: Pioneer Electronic Corporation, Tokyo, Japan

[21] Appl. No.: 777,054

[22] Filed: Oct. 16, 1991

[30] Foreign Application Priority Data

Apr. 12, 1991 [JP] Japan .................. 3-33588[U]

[51] Int. Cl.⁵ .............................................. H04B 1/00
[52] U.S. Cl. .................................... 381/86; 74/10 R;
74/553; 334/7; 334/88; 192/95; 455/345;
455/348; 455/349
[58] Field of Search ............... 74/10 R, 553; 192/95;
334/7, 88; 455/348, 349, 345, 153.1, 153.2;
361/422

[56] References Cited

U.S. PATENT DOCUMENTS

| | | | |
|---|---|---|---|
| 2,056,305 | 10/1936 | Thomas | 74/553 |
| 3,418,857 | 12/1968 | Klein | 74/10 |
| 3,755,740 | 8/1973 | Maugans | 74/10 R |
| 4,532,817 | 8/1985 | Chaki | 74/553 |
| 4,940,414 | 7/1990 | Lee | 455/349 |

Primary Examiner—Forester W. Isen
Attorney, Agent, or Firm—Nikaido, Marmelstein, Murray & Oram

[57] ABSTRACT

A knob for operating a fader as an electronic device of a car stereo is rotatably and axially slidably mounted on a grille detachably attached to a car stereo body. A wall of the car stereo body facing the grille when attached thereto, has an opening through which the knob passes. A manually rotated operating shaft of the fader is disposed inside the body of the car stereo behind the opening. When the knob is pushed into the body through the opening, the knob is connected with the operating shaft of the fader.

3 Claims, 10 Drawing Sheets

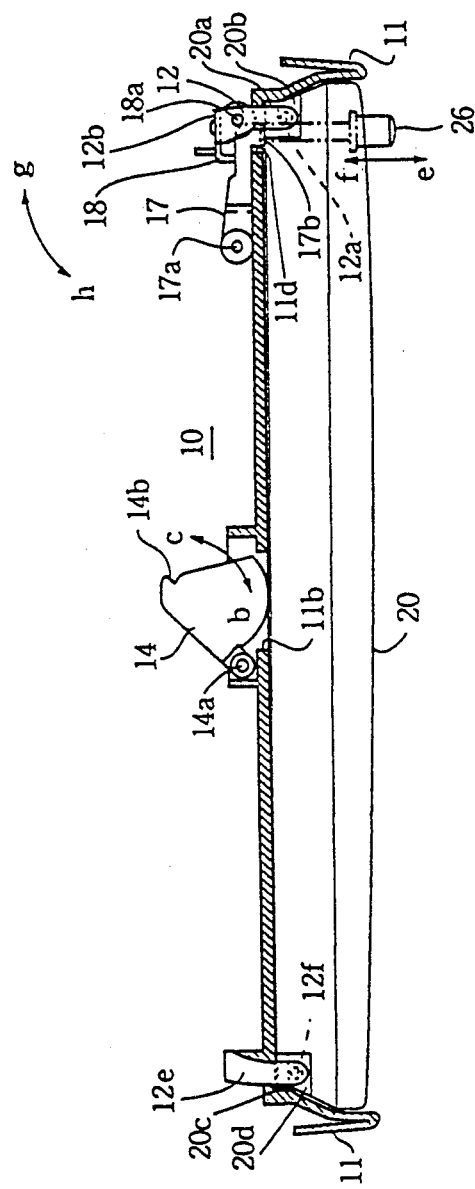
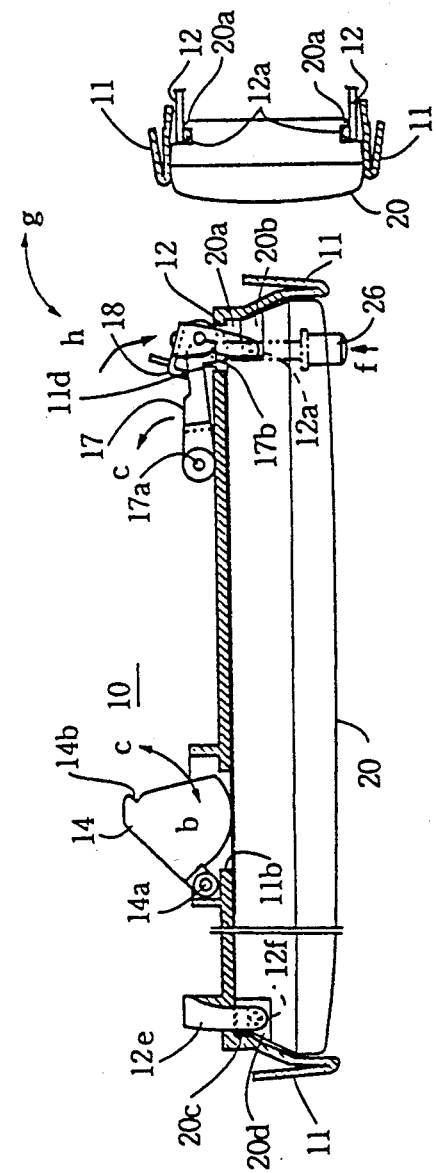
FIG.2
FIG.3a
FIG.3b

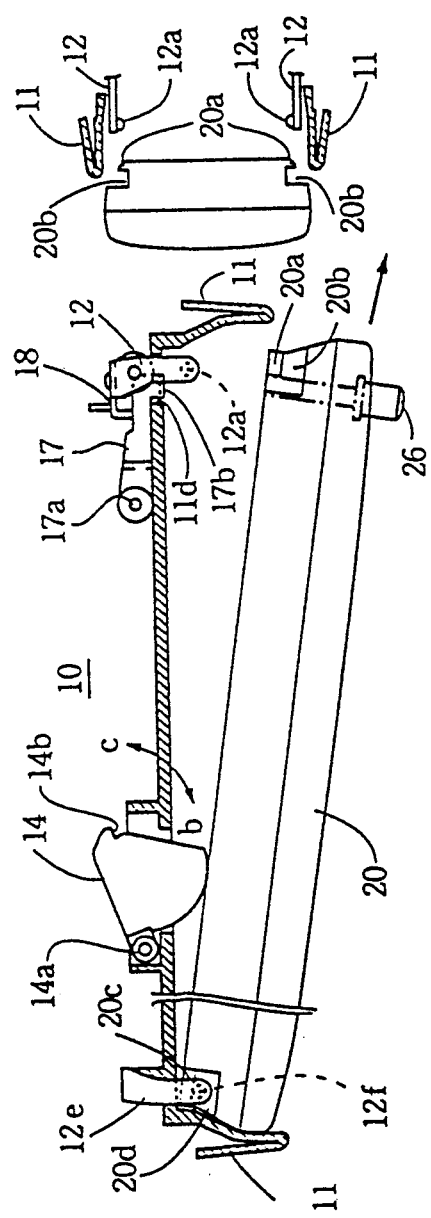

OPERATING DEVICE OF AN ELECTRONIC EQUIPMENT MOUNTED ON A MOTOR VEHICLE

BACKGROUND OF THE INVENTION

The present invention relates to a structure for connecting a knob provided on a detachable grille of a car stereo with an electronic device equipment such as a fader mounted in the car stereo.

Increase in use of sophisticated car stereo in recent years has caused increase in the theft of the stereo. In order to prevent the theft of the stereo, there has been proposed measures for the stereo. In accordance with one of the measures, a grille having a plurality of push buttons for the stereo is provided to be separated from the body of the stereo, and is detachably attached to the front portion of the stereo.

FIGS. 14 to 16 show the above described prior art. The car stereo comprises a car stereo body 1 and a detachable grille 3 attached to the body 1. The body 1 has recessed panel 5 mounted at the front thereof. The grille 3 has various push buttons 2 and a fader knob 2a which can be connected to a corresponding fader provided in the body when the grille 3 is attached to the body 1. For example, the fader knob 2a is connected to a fader shaft 9 projecting from the panel 5.

Referring to FIG. 15, in order to attach the grille 3 on the body 1, a groove 4 formed in one side of the grille 3 is engaged with a projection 6 projecting into the recess of the panel 5 from an inner edge thereof, thereby positioning the grille 3. The grille 3 is then pivoted about the projection 6 so as to close in on the panel 5, so that a hook 7a formed on an end of an engaging member 7 of a push-push mechanism (not shown) provided in the body 1 engages with a recess 8 formed at the inner corner of the other end of the grille 3. The engaging member 7 is retracted as the grille 3 is pivoted. Thus the grille 3 fits in the recess of the panel 5, where the member 7 is locked by the push-push mechanism. If the grille 3 is forcibly depressed, the lock mechanism is released, so that the grille can be removed from the body.

For operating the fader, the fader knob 2 which fits over the shaft 9 is operated to turn the shaft 9.

In order to detach the grille 3 from the panel 5, the grille 3 at the side having the inner recess 8 is depressed. The push-push mechanism is accordingly operated to project the engaging member 7 as shown is FIG. 16. The grille 3 is pivoted about the projection 6 and pulled off the panel 5 of the body 1.

When the grille 3 is taken out, the stereo body loses the appearance as a car stereo. Hence, if the driver takes the grille 3 with him when leaving the vehicle, the theft of the car stereo is prevented.

However, in the conventional car stereo, the fader volume shaft 9 is kept apparent as shown in FIG. 14 when the grille 3 is detached. The shaft 9 suggests the existence of the car stereo so that the theft cannot be effectively prevented.

SUMMARY OF THE INVENTION

An object of the present invention is to provided a simple operating device of an electronic device of a car stereo wherein the operating device is hidden from view when a detachable grille thereof is removed.

According to the present invention, a knob for operating an operating device of a car stereo is mounted on a detachable grille. A wall of a body of the car stereo facing the grille when attached thereto, has an opening through which the knob passes. A shaft of the operating device is disposed inside the body of the car stereo behind the opening. When the grille is attached, the knob is pushed into the body through the opening so as to be connected with the shaft of the electronic equipment, whereby the knob is turned to operate the equipment.

The other objects and features of this invention will become understood from the following description with reference to the accompanying drawings.

BRIEF DESCRIPTION OF DRAWINGS

FIG. 2 is a sectional view of a part of the car stereo with the grille attached;

FIGS. 3a, 3b, 4a and 4b are sectional views of a part of the car stereo describing the attaching and detaching operations of the grille;

DETAILED DESCRIPTION OF THE PREFERRED EMBODIMENTS

Figure 1:
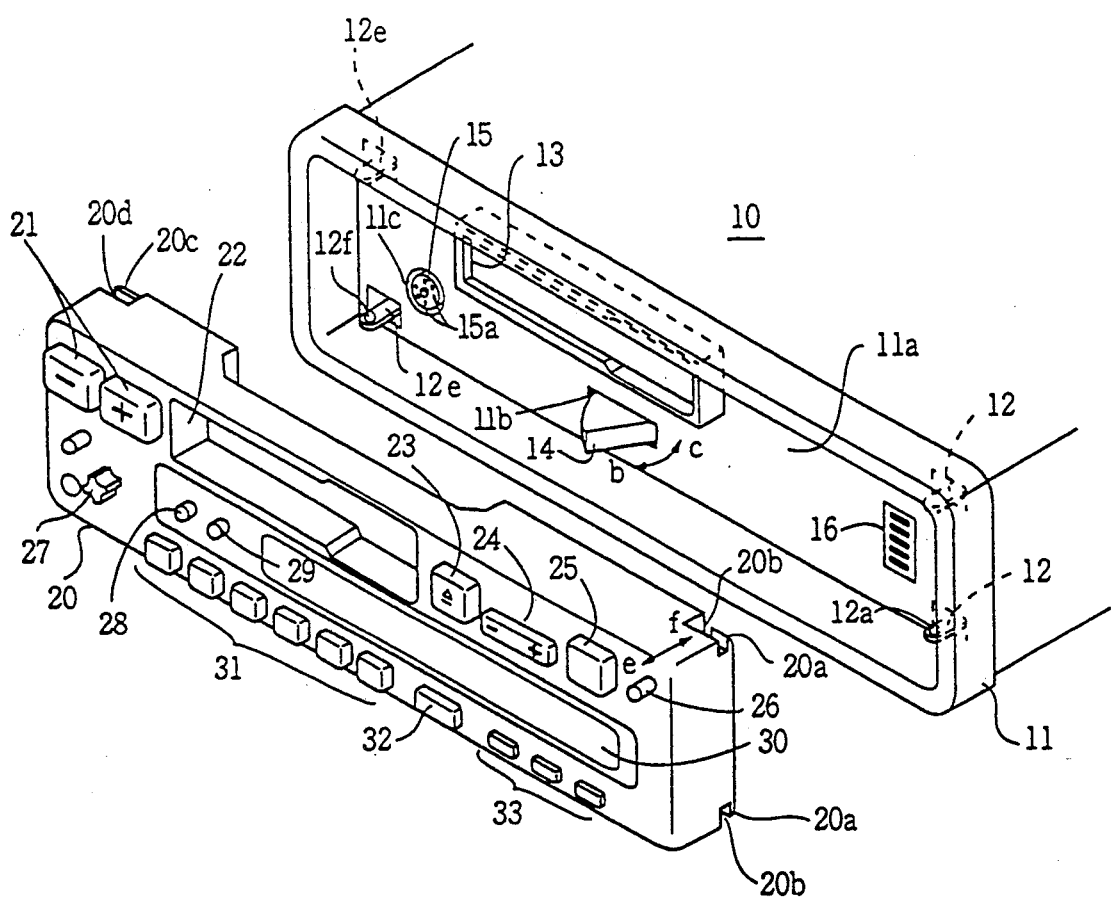
FIG. 1 is a perspective view of a car stereo having a detachable grille to which the present invention is applied, with the grille shown in a detached state.

Referring to FIG. 1, a car stereo as one of electric equipments to which the present invention is applied comprises a car stereo body 10 and a grille 20.

On the face of the grille 20 are provided various push buttons and knobs for operating the car stereo. Namely, in the upper row from the left to the right, provided are a pair of volume control buttons 21, cassette opening 22, ejection button 23, mode select button 24 and source select button 25. In the second row, also from the left are a fader knob 27, loudness button 28, time adjusting button 29 and a liquid crystal display 30. In the bottom row, six preset buttons 31, frequency select button 32 and function buttons 33 for selecting the operational functions of the car stereo are provided under the buttons 28, 29 and the display 30 from the left.

A release button 26 urged in a direction e in the figure by a spring (not shown) is provided at an upper right hand corner of the grille 20 for releasing the grille 20 from the body 10. Each of the rear upper and lower right hand corners of the grille 20 is partly cut way to form a recess 20b and a tongue 20a having a slant at the back thereof. A recess 20d and tongue 20c similar to the recess 20b and tongue 20a respectively, are formed at each of the upper and lower rear corner of the left side of the grille 20.

A front panel 11 having a recess 11a is fixed on the outer periphery of the front portion of the car stereo body 10. The recess 11a is so dimensioned that the grille 20 snugly fits therein. At an upper central portion of the panel 11 is formed a cassette opening 13 which coincides with the cassette opening 22 of the grille 20.

An opening 11b through which a push member 14 provided in the body 10 protrudes is formed under the cassette opening 13. A shown in FIG. 2, the push member 14 is pivotally mounted on a shaft 14a attached to the back of the panel 11. The push member 14 is urged by a spring (not shown) in a direction b until a lobe 14b thereof engages the periphery of the opening 11b. When the grille 20 is inserted in the recess 11a, the member 14 is pushed in a direction c into the body 10 against the elastic force of the spring as shown in FIG. 2.

Explaining a releasing mechanism for the grille 20, an arm 17 is pivotally mounted on a shaft 17a adjacent the upper right hand corner of the panel 11 inside the car stereo body 10. The arm 17 urged by a spring (not shown) in the direction b, that is in the same direction as the push member 14, abuts against the panel 11. An abutting end 17b of the arm 17 adapted to confront the release button 26 provided on the grille 20 is partly inserted in a hole 11d formed in the panel 11.

At each of the upper and lower corners, a lever 18 is mounted on a shaft 18a to be pivoted in directions g and h. The lever 18 is urged by a spring (not shown) in the direction h. thereby abutting one side thereof against the arm 17. To an end of the lever 18 is attached a flexible latch member 12 which projects out of a hole formed in the panel 11. The latch member 12 has a projection 12a which engages in the recess 20b of the grille 20 at a position inside the tongue 20a.

A flexible latch member 12e having a downward or upward projection 12f is mounted on the body 10 facing each of the tongues 20c and recesses 20d of the grille 20 at the other corners thereof as shown in FIG. 2, to hold the grille 20. The shafts 18a of the upper and lower levers 18 are connected with each other, so that both levers 18 are rotated together.

A series of terminals 16 connected to terminals (not shown) provided on the back of the grille 20 is disposed at the right-hand side of the panel 11. To the left of the cassette opening 13 corresponding to the position of the fader knob 27 is formed a shaft opening 11c. A connector 15 having a plurality of projections 15a, for connecting the fader knob 27 to a fader controller 15c as a manually operated electronic device (FIG. 7) is disposed in the body 10 directly behind the panel 11 facing the opening 11c. Means for connecting the knob 27 to the connector 15 is described hereinafter.

Figure 5:
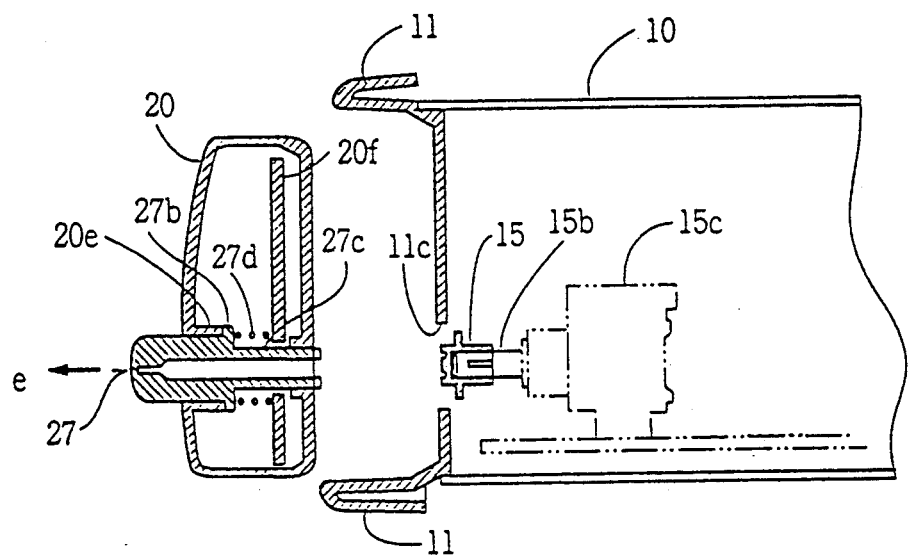
FIG. 5 is a sectional view of the knob and a connector of a fader controller.
Figure 6:
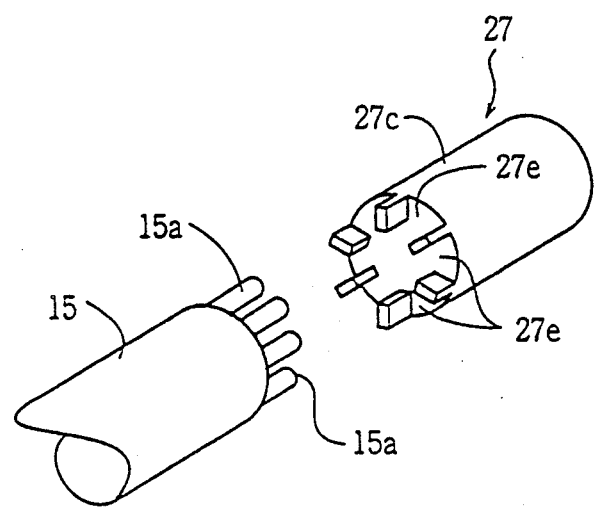
FIG. 6 is an enlarged perspective view of the knob and the connector of FIG. 5.

Referring to FIG. 5, the fader knob 27 has a flange 27b and a shaft 27c extending rearward from the flange 27b. The knob 27 and the shaft 27c are rotatably mounted on the grille 20. A spring 27d is provided between the flange 27b and an inner plate 20f securely mounted in the grille 20, thereby urging the knob 27 in the direction e as shown in the figure. The knob 27 is prevented from slipping out of the grille 20 by the engagement of the flange 17b with an inner projection 20e formed on an inner wall of the grille 20. As shown in FIG. 6, at the inner end of the shaft 27c is formed a plurality of circumferential recesses 27e with each of which the projections 15a of the connector 15 is engaged. The connector 15 is connected to a shaft 15b of the fader controller 15c.

The operation for attaching the grille 20 to the car stereo body 10 is described hereinafter. The grille 20 is held in parallel with the panel 11 and inserted in the recess 11a. The projections 12a and 12f of the latch members 12 and 12e abut against inclined backs of the tongues 20a and 20c of the grille 20. As the grille 20 is further pushed in the panel 11, each of the latch members 12, 12e deflects as the projections 12a, 12f thereof tries to slide over the tongues 20a and 20c. Thereafter, the projections 12a, 12f overcome the tongues 20a and 20c and fit in the recesses 20b and 20d as shown in FIG. 3b, thereby securely holding the grille 20 in the recess 11a. The push member 14, pushed by the back wall of the grille 20, pivots about the shaft 14a in the direction c against the urging of the spring so as to be disposed inside the car stereo body 10 as shown in FIG. 3a.

Figure 7:
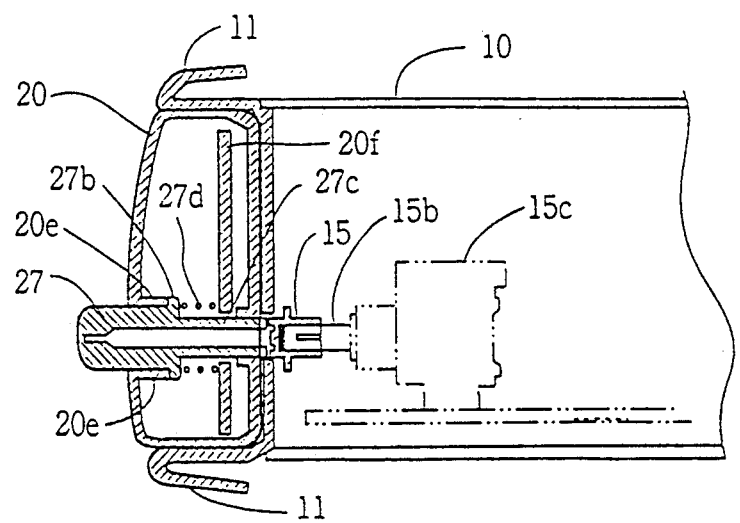
FIG. 7 is a sectional view showing the knob and the connector when the grille is attached.
Figure 8:
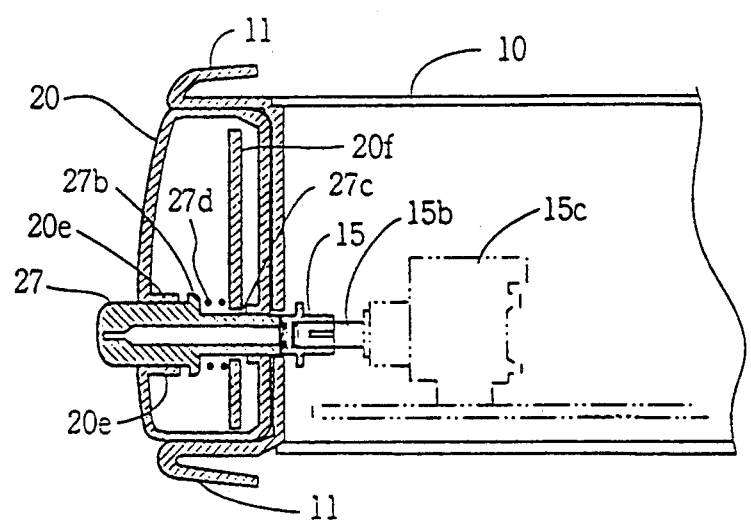
FIG. 8 is a sectional view showing the knob and the connector when operating the controller.

Referring to FIG. 7, when the grille 20 is held in the recess 11a, the shaft 27c of the fader knob 27 is inserted in the opening 11c, thereby to oppose the connector 15 of the fader controller 15c. In order to operate the controller 15c, the knob 27 is depressed against the urging of the spring 27d so that the shaft 27c abuts against the connector 15. By slightly turning the knob 27 in the clockwise or counterclockwise direction while depressing the knob 27, the recesses 27 are engaged with the projection 15a as shown in FIG. 8, thereby enabling the controller 15c to be operated through the shaft 15b. When the knob 27 is released, the spring 27d urges the knob 27 to return to the initial position.

In order to detach the grille 20 from the car stereo body 10, the release button 26 on the grille is depressed in a direction f as shown in FIG. 3a. The inner end of the button 26 abuts on the abutting end 17b of the arm 17, thereby rotating the arm in the direction c. The rotation of the arm 17 causes the upper and lower levers 18 to pivot together with the shafts 18a in the direction g. As a result, each latch member 12 connected to the lever 18 is horizontally rotated also in the direction g, thereby releasing the projection 12a from the recess 20b and the tongue 20a.

Referring to FIG. 4a, as the grille 20 is slightly detached from the panel 11, the push member 14 is rotated in the direction b by the urging of a spring to protrude out of the opening 11b, thereby pushing the grille 20. Since the left hand corners of the grille 20 are still attached to the panel 11, the grille 20 is pivotally pushed by the push member 14 about the left rear side edge thereof until the lobe 14b of the push member 14 abuts against the panel 11. The grille 20 is then pulled to the right as shown by an arrow in FIG. 4a, thereby releasing the engagement between the projections 12f and the tongues 20c. Thus the grille is removed from the body 10.

When the grille 20 is thus detached from the body 10, nothing indicates the existence of the car stereo. More particularly, since the shaft 15b of the fader controller 15c is hidden inside the body 10, only the projections 15a of the connector 15 are shown through the opening 11c. Hence the theft of the car stereo can be effectively prevented.

Figure 9:
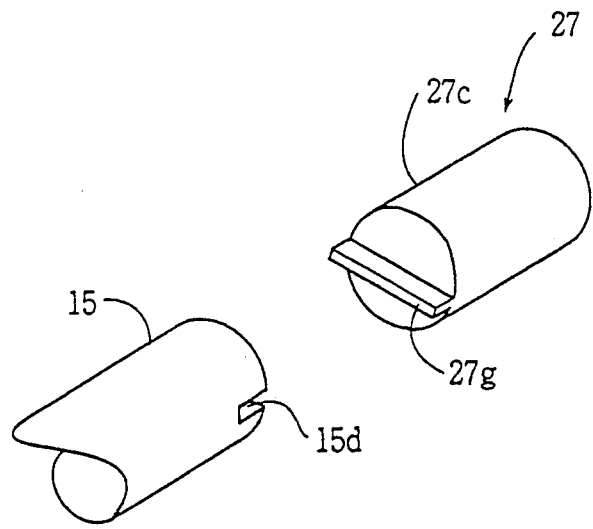
FIGS. 9 and 10 are perspective views showing modifications of the knob and the connector.
Figure 10:
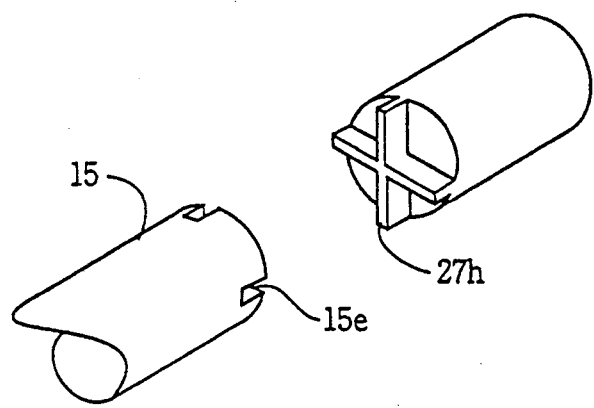

FIGS. 9 and 10 show modifications of the means for engaging the shaft 27c of the fader knob 27 with the connector 15. Referring to FIG. 9, the shaft 27c is a solid shaft having a diametrical projection 27g and the connector 15 has a diametrical groove 15d which engages with the projection 27g. Alternatively, a cross-shaped projection 27h is formed at the end of the shaft 27c and a cross-shaped groove 15e is formed in the connector 15 as shown in FIG. 10.

Modifications of the push member 14 provided in the car stereo to which the present invention is applied are described hereinafter with reference to FIGS. 11 to 13. The same reference numerals as those in FIG. 1 designate the same parts in each figure.

Figure 11:
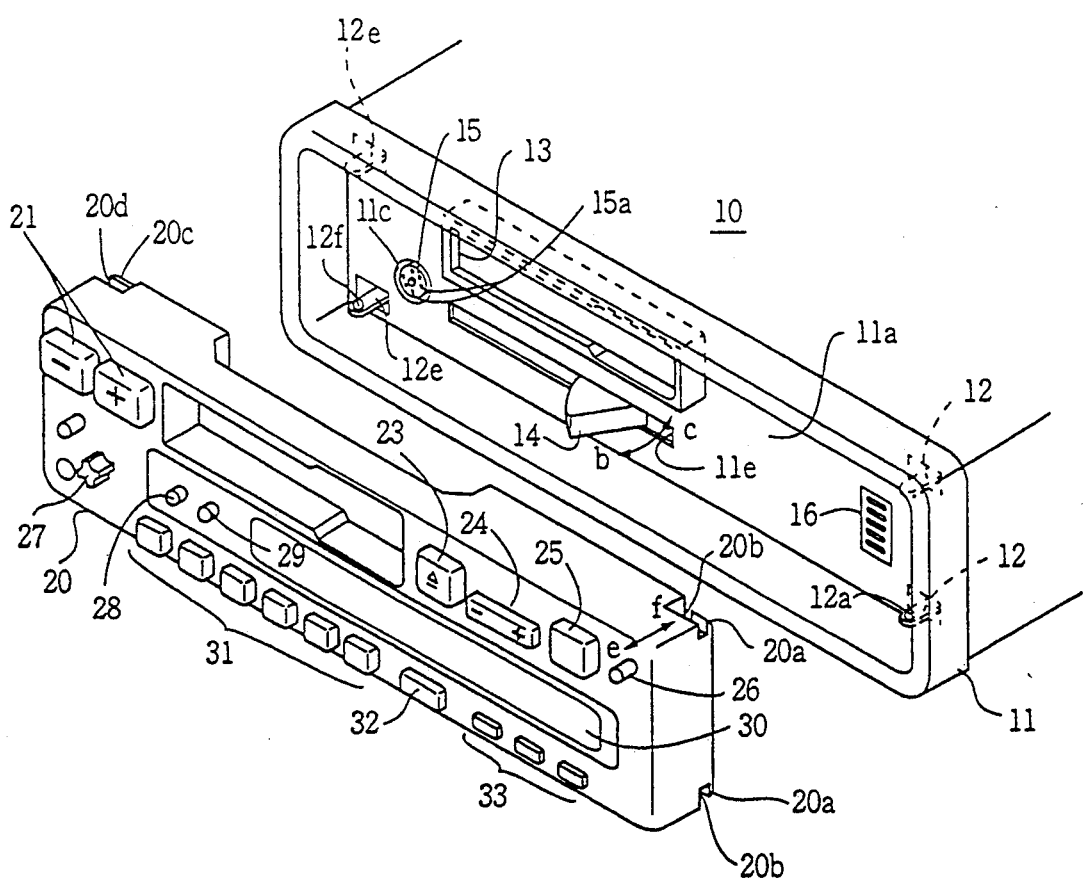
FIGS. 11 to 13 are perspective views showing modifications of the car stereo to which the present invention is applied.

Referring to FIG. 11, the panel 11 attached to the car stereo body 10 has a laterally elongated opening 11e in which the push member 14 urged by a spring in the direction b slides. By sliding the push member 14 in the opening 11e, the distance between the member 14 and the pivot, namely rear left side edge of the grille 20 about which the grille 20 pivots when detaching the grille, can be changed. As the push member 14 approaches the pivot, the grille 20 rotates a larger angle. Accordingly, in the modification, the pivoting angle of the grille by the push member 14 can be controlled.

Figure 12:
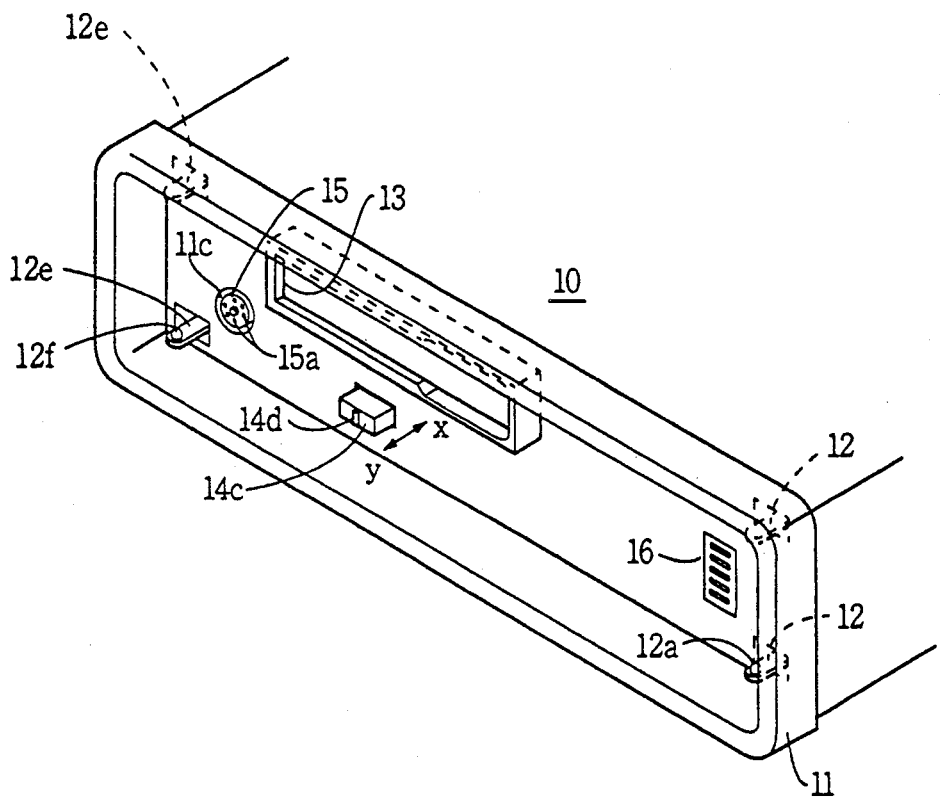

A push member 14c of the modification shown in FIG. 12 is urged by a spring in a direction y, thereby shifting in directions x and y. A roller 14d which abuts on the grille 20 is provided on the front side of the push member 14c. When releasing the grille 20, the roller 14d decreases the sliding friction between the push member 14c and the grille 20, thereby smoothly rotating the grille 20.

Figure 13:
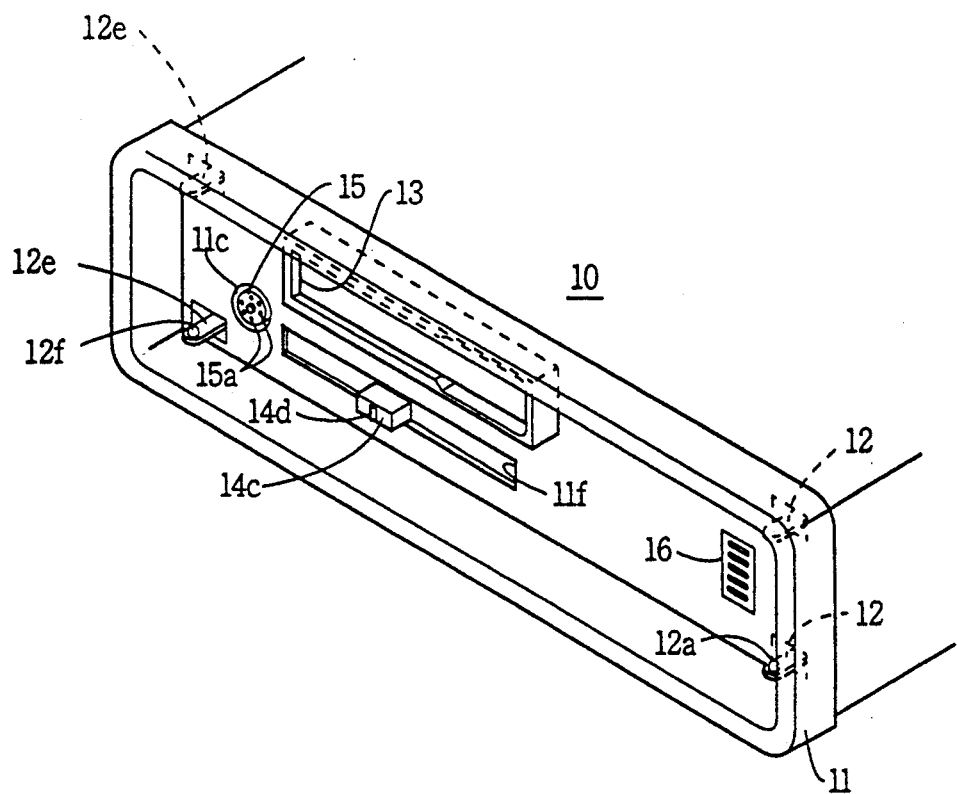
Figure 14:
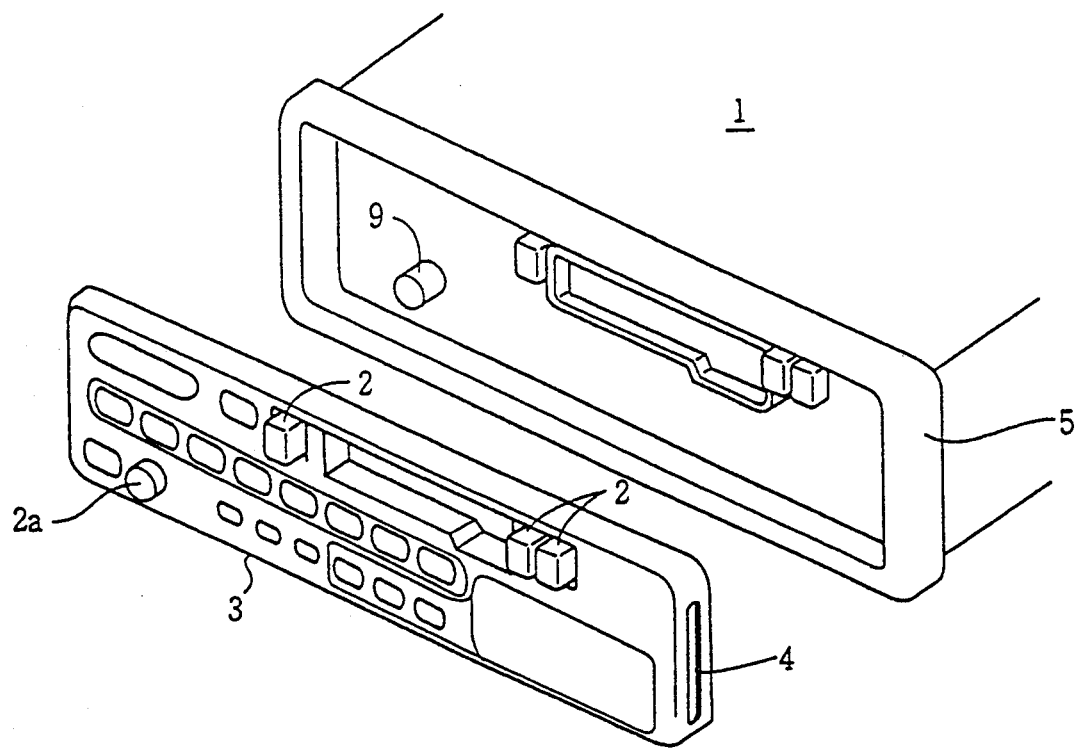
FIG. 14 is a perspective view of a conventional car stereo having a grille, shown in a detached state.
Figure 15:
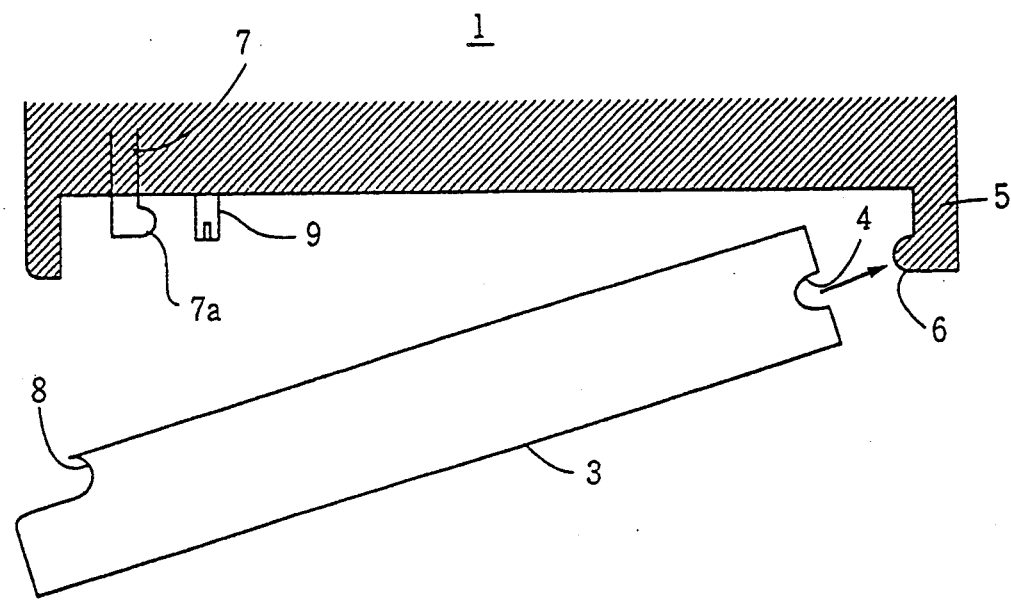
FIGS. 15 and 16 are schematic sectional views of the conventional car stereo describing the attaching and detaching operations of the grille.
Figure 16:
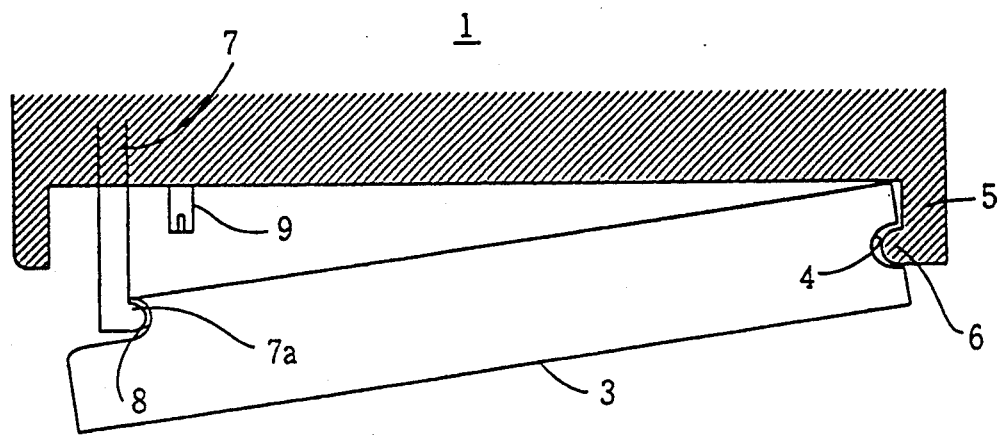

In the modification shown in FIG. 13, the push member 14c having the roller 14d slides in an elongated opening 11f formed in the panel 11. Thus the pivoting angle of the grille 20 can be controlled in the same manner as in the modification shown in FIG. 11. Since the member 14 has the roller 14d for decreasing the sliding friction, a larger pivoting angle can be provided.

In accordance with the present invention, there is provided a knob having a simple construction for operating an electronic device of a car stereo wherein a detachable grille is provided as antitheft means. When the grille is removed from the car stereo, an operating shaft of the electronic device, which is hidden inside the body of the car stereo, is hardly visible so that the theft is effectively prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An operating device of an electronic equipment mounted on a motor vehicle, the electonric equipment having an equipment body secured to a vehicle body of the motor vehicle, and a grille detachably mounted on a front panel of the equipment body, comprising:
   a knob rotatably and axially slidably mounted on the grille;
   a spring for outwardly urging the knob;
   a manually operated electronic device having a manually rotated operating shaft and provided in the equipment body;
   a front end of the manually rotated operating shaft being located slightly inside of an opening formed on the front panel of the equipment body; and
   connecting means for connecting a rear end of the knob with the front end of the operating shaft when the knob is depressed against the spring.

2. An operating device according to claim 1 wherein the connecting means comprises at least one projection formed on one of said front or rear ends and at least one recess formed on the other of said front or rear ends so as to be coupled with the projection.

3. An operating device according to claim 1 wherein the electronic equipment is a car stereo and the manually operated electronic device is a fader of the car stereo.

* * * * *